(12) United States Patent
Hong et al.

(10) Patent No.: US 12,649,510 B2
(45) Date of Patent: Jun. 9, 2026

(54) INTERMEDIATE SHAFT OF STEERING APPARATUS FOR VEHICLE

(71) Applicant: NAMYANG NEXMO Co., Ltd, Ansan-si (KR)

(72) Inventors: Jin Yong Hong, Ansan-si (KR); Jong Hak Woo, Incheon (KR); Hyun Woo Kim, Incheon (KR)

(73) Assignee: NAMYANG NEXMO CO., LTD, Ansan-si (KR)

( * ) Notice: Subject to any disclaimer, the term of this patent is extended or adjusted under 35 U.S.C. 154(b) by 20 days.

(21) Appl. No.: 19/019,541

(22) Filed: Jan. 14, 2025

(65) Prior Publication Data

US 2025/0153762 A1      May 15, 2025

Related U.S. Application Data

(63) Continuation of application No. PCT/KR2023/011658, filed on Aug. 8, 2023.

(30) Foreign Application Priority Data

Aug. 8, 2022     (KR) ........................ 10-2022-0098813

(51) Int. Cl.
*B62D 1/20* (2006.01)
*B62D 1/16* (2006.01)

(52) U.S. Cl.
CPC ............... *B62D 1/20* (2013.01); *B62D 1/163* (2013.01)

(58) Field of Classification Search
CPC ................................... B62D 1/20; B62D 1/163
See application file for complete search history.

(56) References Cited

U.S. PATENT DOCUMENTS

| | | | |
|---|---|---|---|
| 6,655,709 B2 | 12/2003 | Sherwin et al. | |
| 7,416,199 B2 * | 8/2008 | Yamada | F16C 3/035 |
| | | | 74/552 |
| 9,951,806 B2 * | 4/2018 | Kurokawa | B62D 1/20 |
| 10,160,476 B2 * | 12/2018 | Miyawaki | F16D 3/06 |

(Continued)

FOREIGN PATENT DOCUMENTS

| | | | |
|---|---|---|---|
| JP | H08-099641 A | 4/1996 | |
| JP | 2002264825 A * | 9/2002 | F16D 3/06 |

(Continued)

OTHER PUBLICATIONS

JP-2002264825-A (machine translation) (Year: 2002).*
International Search Report for PCT/KR2023/011658 mailed Nov. 15, 2023 from Korean Intellectual Property Office.

*Primary Examiner* — Jason D Shanske
*Assistant Examiner* — Joselynn Y Sliteris
(74) *Attorney, Agent, or Firm* — Paratus Law Group, PLLC

(57) ABSTRACT

An intermediate shaft of a steering apparatus for a vehicle, includes a yoke tube having one end at which a first U-shaped member is disposed, and the other end at which a hollow portion is formed in an axial direction, a cable having one end at which a second U-shaped member is disposed, and a first coupler provided at the other end of the cable and disposed and inserted into the hollow portion, such that it is possible to electrically and electronically control a steering motor by using some components of a steering apparatus having a physical connection structure in the related art.

6 Claims, 6 Drawing Sheets

(56) References Cited

U.S. PATENT DOCUMENTS

| | | | |
|---|---|---|---|
| 10,883,533 B2 * | 1/2021 | Koyama | F16D 3/06 |
| 11,167,786 B2 * | 11/2021 | Ishikawa | F16D 3/387 |
| 11,325,637 B2 * | 5/2022 | Kamitani | F16D 3/06 |
| 11,813,801 B2 * | 11/2023 | Hirschauer | B29C 65/088 |
| 12,179,831 B1 * | 12/2024 | Hanson | B62D 1/16 |
| 2009/0317183 A1 * | 12/2009 | Fritz | F16D 3/387 |
| | | | 403/409.1 |
| 2017/0219016 A1 * | 8/2017 | Kobayashi | F16D 1/0864 |
| 2020/0307673 A1 * | 10/2020 | Ishikawa | F16J 15/3252 |

FOREIGN PATENT DOCUMENTS

| | | | |
|---|---|---|---|
| JP | 2004-130933 A | 4/2004 |
| KR | 20-1998-0022298 U | 7/1998 |
| KR | 10-1965133 B1 | 4/2019 |
| KR | 10-2022-0081772 A | 6/2022 |

* cited by examiner (a)                                    (b)

INTERMEDIATE SHAFT OF STEERING APPARATUS FOR VEHICLE

CROSS-REFERENCE TO PRIOR APPLICATIONS

This application is a Continuation Application of PCT International Application No. PCT/KR2023/011658 (filed on Aug. 8, 2023), which claims priority to Korean Patent Application No. 10-2022-0098813 (filed on Aug. 8, 2022), which are all hereby incorporated by reference in their entirety.

ACKNOWLEDGEMENT

National Research and Development Project That Supported the Invention

[Project Unique Number] 0013843
[Project Number] P0013843
[Ministry Name] Ministry of Trade, Industry and Energy
[Name of Project Management (Specialized) Organization] Korea Institute for Advancement of Technology
[Research Project Name] Commercial Vehicle Industry Innovation Growth and Future Industrial Ecosystem Establishment Project
[Research Project Name] Development of Motor Driven Power Steering System (MDPS) with Steering Thrust of 3,500 kgf
[Contribution Rate] 1/1
[Name of Project Organization] DY ESSYS Corporation
[Research Period] January 1, 2022 to Dec. 31, 2022

BACKGROUND

The present invention relates to an intermediate shaft of a steering apparatus for a vehicle, and more particularly, to an intermediate shaft of a steering apparatus for a vehicle, the intermediate shaft being installed between a steering shaft and a steering gear in the steering apparatus for a vehicle.

Meanwhile, the present application was supported by the national research and development project disclosed below.

In general, a steering wheel is disposed forward of a driver seat in an occupant compartment of a vehicle and constitutes a steering apparatus of the vehicle.

The steering wheel is held and rotated by driver's hands to adjust a traveling direction of the vehicle. That is, the driver rotates the steering wheel leftward in case that the driver intends to adjust the traveling direction of the vehicle to the left while the vehicle travels. The driver rotates the steering wheel rightward in case that the driver intends to adjust the traveling direction of the vehicle to the right.

In addition to the steering wheel, the steering apparatus of the vehicle includes a steering shaft having an upper end at which the steering wheel is installed, an intermediate shaft having an upper end connected to a lower end of the steering shaft by means of a universal joint, a steering motor connected to a lower end of the intermediate shaft by means of a universal joint, and a steering gear having a rack bar configured to engage with a pinion gear provided at a lower end of a rotary shaft of the steering motor.

The intermediate shaft broadly includes two parts, such that a length of the intermediate shaft is changed in an axial direction. That is, the intermediate shaft includes a yoke tube and a yoke shaft, and an upper end of the yoke shaft is inserted into a lower end of the yoke tube, such that the yoke shaft is installed to be slidable in the axial direction. When the upper end of the yoke shaft slides in the axial direction in the lower end of the yoke tube, the length of the intermediate shaft is changed in the axial direction, and the intermediate shaft absorbs vibration to be transmitted from a vehicle wheel to the steering wheel.

The lower end of the yoke shaft is coupled to an upper end of the rotary shaft of the steering motor by means of the universal joint. The pinion gear provided at the lower end of the rotary shaft of the steering motor engages with the rack bar disposed in a housing of the steering gear and disposed to be movable leftward and rightward. A left tie rod and a right tie rod are respectively coupled to two opposite left and right ends of the rack bar. The left tie rod is connected to a knuckle of a left vehicle wheel, and the right tie rod is connected to a knuckle of a right vehicle wheel.

When the rotary shaft of the steering motor rotates in one direction, the rack bar rectilinearly moves leftward, and thus the left tie rod and the right tie rod rectilinearly move leftward and rotate the knuckles, which are respectively coupled to the left and right vehicle wheels, leftward, such that the left and right vehicle wheels are steered leftward.

In addition, in case that the rotary shaft of the steering motor rotates in the other direction, the rack bar rectilinearly moves rightward, and thus the left tie rod and the right tie rod rectilinearly move rightward and rotate the knuckle, which are respectively coupled to the left and right vehicle wheels, rightward, such that the left and right vehicle wheels are steered rightward.

Meanwhile, as described above, the steering apparatus for a vehicle has a structure in which the steering wheel is mechanically connected to the left and right vehicle wheels. However, recently, with the development of electric and electronic devices, a steer-by-wire steering apparatus has been developed, which is structured such that an upper structure is separated from the steering motor based on the steering motor among the components of the steering apparatus for a vehicle.

Korean Patent Application Laid-Open No. 10-2022-0081772 (Jun. 16, 2022) (hereinafter, referred to as 'the related art').

In the related art, an angle sensor and a torque sensor are coupled to one side of the steering shaft connected to the steering wheel, and the angle sensor and the torque sensor, which detect the manipulation of the steering wheel by the driver, transmit electrical signals to an electronic control device so that a steering shaft motor and a pinion shaft motor are operated.

However, because the related art provides a structure in which the steering shaft and the pinion shaft motor are completely separated, there is a problem in that the configuration of the steering apparatus with the physical connection structure in the related art cannot be used, and a steering apparatus with a new structure needs to be configured.

SUMMARY

A technical object of the present invention is to provide an intermediate shaft of a steering apparatus for a vehicle, the steering capable of electrically and apparatus being electronically controlling a steering motor while using some components of a steering apparatus having a physical connection structure in the related art.

Another technical object of the present invention is to provide an intermediate shaft of a steering apparatus for a vehicle, the intermediate shaft being capable of being adjusted in length and installed to suit the specifications of types of vehicles.

The technical objects of the present invention are not limited to the aforementioned technical objects, and other technical objects, which are not mentioned above, may be clearly understood by those skilled in the art from the following descriptions.

In order to achieve the above-mentioned objects, an intermediate shaft of a steering apparatus for a vehicle according to the present invention may include a yoke tube, a cable, and a first coupler. A first U-shaped member may be disposed at one end of the yoke tube. A hollow portion may be formed in an axial direction at the other end of the yoke tube. A second U-shaped member may be disposed at one end of the cable. The first coupler may be provided at the other end of the cable. The first coupler may be disposed and inserted into the hollow portion.

The first coupler may be disposed in the hollow portion and configured to be movable in the axial direction.

At least one first planar portion may be formed on an inner peripheral surface of the yoke tube. At least one second planar portion may be formed on an outer peripheral surface of the first coupler and configured to come into contact with at least one first planar portion.

A plurality of serration grooves may be formed in an inner peripheral surface of the yoke tube. A plurality of serration protrusions may be formed in an outer peripheral surface of the first coupler and be respectively inserted into the plurality of serration grooves.

A cover having a column shape may be coupled to the other end of the yoke tube. The cover may prevent the first coupler from being withdrawn from the hollow portion.

A screw thread may be formed on an inner peripheral surface of the cover and coupled to a screw thread formed on an outer peripheral surface of the other end of the yoke tube.

A second coupler may be provided at one end of the cable. The second coupler may be coupled to a neck portion of the second U-shaped member.

In a state in which one end of the cable is inserted into a first inner groove formed in one surface of the second coupler and the other end of the second coupler is inserted into a second inner groove formed in one surface of the neck portion of the second U-shaped member, an outer side of the neck portion of the second U-shaped member may be pressed inward by a caulking tool, such that one end of the cable, the other end of the second coupler, and the neck portion of the second U-shaped member may be coupled by caulking.

In a state in which one end of the cable is inserted into a first inner groove formed in one surface of the second coupler and the other end of the second coupler is inserted into a second inner groove formed in one surface of the neck portion of the second U-shaped member, a pin may penetrate first pin coupling holes, which are formed at two opposite sides of the neck portion of the second U-shaped member and communicate with the second inner groove, second pin coupling holes, which are formed at two opposite sides of the other end of the second coupler and communicate with the first inner groove, and a third pin coupling hole formed at one end of the cable, such that one end of the cable, the other end of the second coupler, and the neck portion of the second U-shaped member may be coupled by the pin.

In a state in which one end of the cable is inserted into a first inner groove formed in one surface of the second coupler and the other end of the second coupler is inserted into a second inner groove formed in one surface of the neck portion of the second U-shaped member, a pin may penetrate a first pin coupling hole, which is formed at one side of the neck portion of the second U-shaped member and communicates with the second inner groove, and a second pin coupling hole, which is formed at one side of the other end of the second coupler and communicates with the first inner groove, and an end of the pin may press an outer peripheral surface of one end of the cable, such that one end of the cable, the other end of the second coupler, and the neck portion of the second U-shaped member may be coupled by the pin.

Other detailed matters of the embodiment are included in the detailed description and the drawings.

The intermediate shaft of the steering apparatus for a vehicle according to the present invention includes the yoke tube, and the cable connected to the first coupler disposed and inserted into the hollow portion of the yoke tube, such that it is possible to electrically and electronically control the steering motor by using some components of the steering apparatus having the physical connection structure in the related art.

In addition, the intermediate shaft of the steering apparatus for a vehicle according to the present invention may be adjusted in overall axial length by moving the first coupler in the axial direction in the yoke tube, such that the length of the intermediate shaft may be adjusted to suit the specifications of the types of vehicles, and then the intermediate shaft may be installed in various types of vehicles.

The effects of the present invention are not limited to the aforementioned effects, and other effects, which are not mentioned above, will be clearly understood by those skilled in the art from the claims.

Figure 1:
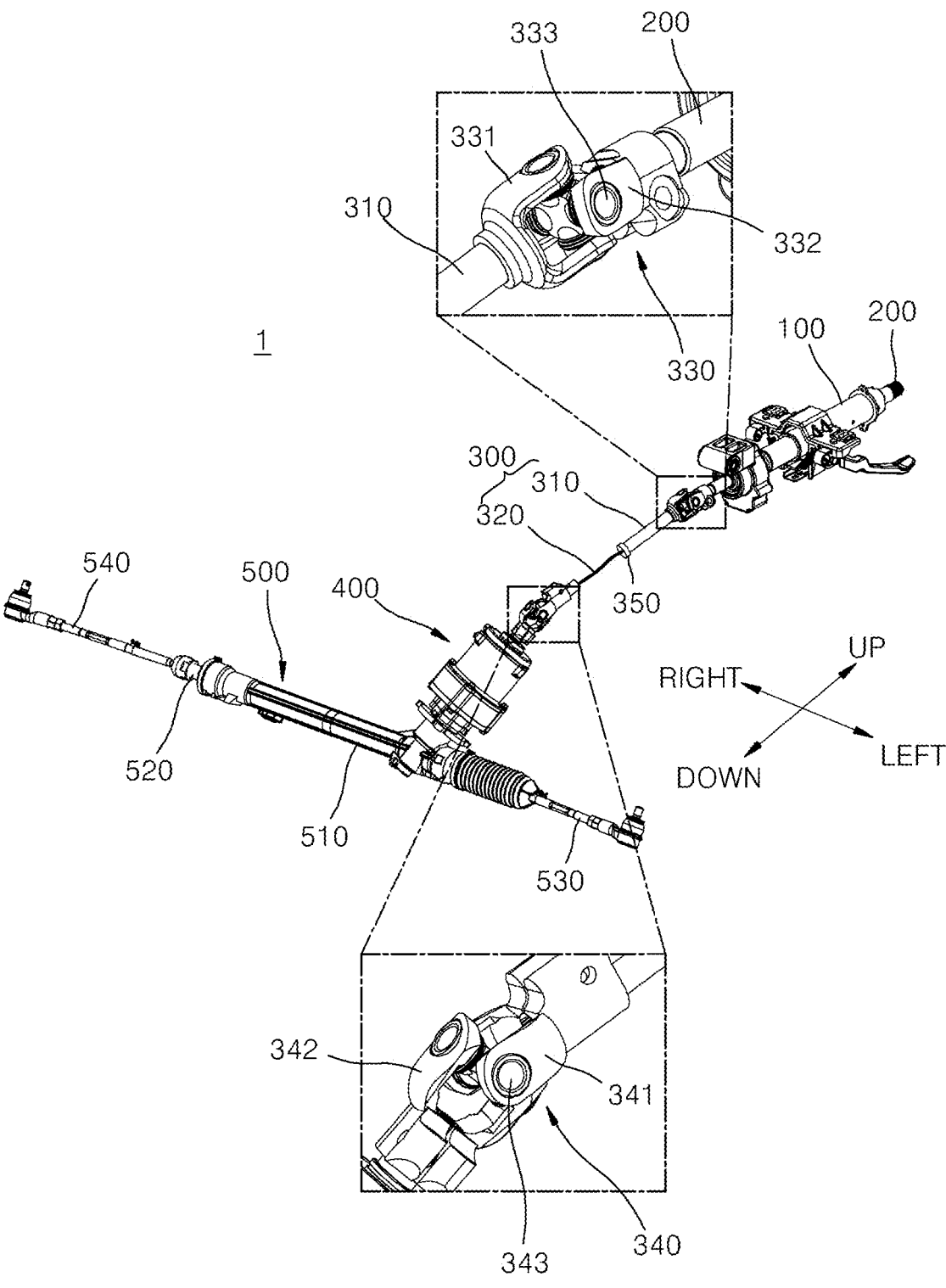
FIG. 1 is a perspective view illustrating a steering apparatus for a vehicle in which an intermediate shaft of the steering apparatus for a vehicle according to an embodiment of the present invention is installed.

EXPLANATION OF REFERENCE NUMERALS
AND SYMBOLS

300: Intermediate shaft
310: Yoke tube

311: First planar portion
312: Serration groove
315: Hollow portion
320: Cable
320A: Third pin coupling hole
331: First U-shaped member
341: Second U-shaped member
341A: First pin coupling hole
345: Second inner groove
348: Neck portion
350: Cover
355: Screw thread
360: First coupler
361: Second planar portion
362: Serration protrusion
370: Second coupler
370A: Second pin coupling hole
375: First inner groove
380, 390: Pin

DETAILED DESCRIPTION

Hereinafter, an intermediate shaft of a steering apparatus for a vehicle according to an embodiment of the present invention will be described with reference to the drawings.

Figure 2:
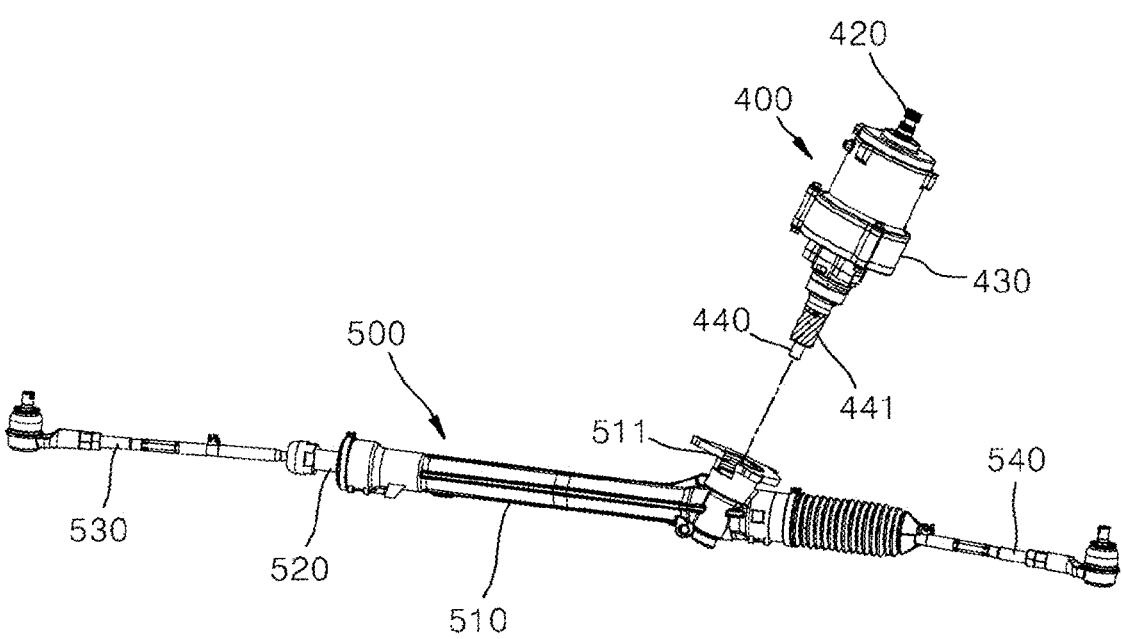
FIG. 2 is a perspective view illustrating a state in which a steering motor illustrated in FIG. 1 is separated from a steering gear.

FIG. 1 is a perspective view illustrating a steering apparatus for a vehicle in which an intermediate shaft of the steering apparatus for a vehicle according to an embodiment of the present invention is installed, and FIG. 2 is a perspective view illustrating a state in which a steering motor illustrated in FIG. 1 is separated from a steering gear.

With reference to FIGS. 1 and 2, a steering apparatus 1 for a vehicle, in which an intermediate shaft 300 of the steering apparatus for a vehicle according to an embodiment of the present invention is installed, may include a steering column 100, a steering shaft 200, the intermediate shaft 300, a steering motor 400, and a steering gear 500.

A mounting bracket may be installed on an outer periphery of the steering column 100, and the mounting bracket may be coupled to a vehicle body and support the steering column 100. The steering column 100 may support the steering shaft 200 so that the steering shaft 10 is rotatable.

The steering shaft 200 may penetrate the steering column 100 in an upward/downward direction. An upper end of the steering shaft 200 may be disposed to protrude from an upper end of the steering column 100, and a lower end of the steering shaft 200 may be disposed to protrude from a lower end of the steering column 100.

A steering wheel (not illustrated) may be coupled to the upper end of the steering shaft 200, and a driver may hold the steering wheel with his/her hand and rotate the steering wheel leftward or rightward to steer vehicle wheels of the vehicle.

The lower end of the steering shaft 200 may be coupled to an upper end of the intermediate shaft 300 by means of a first universal joint 330. That is, the upper end of the intermediate shaft 300 may be coupled to the lower end of the steering shaft 200 by means of the first universal joint 330.

A lower end of the intermediate shaft 300 may be coupled to an input shaft 420 of the steering motor 400 by means of a second universal joint 340. That is, an upper end of the input shaft 420 of the steering motor 400 may be disposed to protrude from an upper end of the steering motor 400 and be coupled to the lower end of the intermediate shaft 300 by means of the second universal joint 340.

A specific configuration of the intermediate shaft 300 will be described later, and the steering motor 400 and the steering gear 500 will be described first.

A pinion shaft 440 may be disposed to protrude from a lower end of the steering motor 400. A pinion gear 441 may be formed on an outer periphery of the pinion shaft 440. The pinion shaft 440 may be inserted into a housing 510 of the steering gear 500. In this state, the pinion gear 441 may engage with a rack (not illustrated) formed on a rack bar 520 disposed in the housing 510 of the steering gear 500 and configured to be movable leftward or rightward.

Tie rods 530 and 540 may be respectively coupled to two opposite left and right ends of the rack bar 520. The tie rods 530 and 540 may include a left tie rod 530 connected to a knuckle of a left vehicle wheel, and a right tie rod 540 connected to a knuckle of a right vehicle wheel.

In case that the pinion shaft 440 is rotated in one direction by driving power of the steering motor 400, the rack bar 520 may rectilinearly move leftward, and thus the left tie rod 530 and the right tie rod 540 may rectilinearly move leftward and rotate the knuckles, which are respectively coupled to the left and right vehicle wheels, leftward, such that the left and right vehicle wheels may be steered leftward.

In addition, in case that the pinion shaft 440 is rotated in the other direction by driving power of the steering motor 400, the rack bar 520 may rectilinearly move rightward, and thus the left tie rod 530 and the right tie rod 540 rectilinearly move rightward and rotate the knuckles, which are respectively coupled to the left and right vehicle wheels, rightward, such that the left and right vehicle wheels may be steered rightward.

The steering motor 400 may be an electric motor configured to be operated by electrical energy. The steering motor 400 may have a rotary shaft having a hollow portion. A speed reducer 430 may be further installed on the steering motor 400. The speed reducer 430 may reduce a rotational speed of the rotary shaft of the steering motor 400 and output the rotational speed. The hollow portion of the rotary shaft of the steering motor 400 may be elongated in an axial direction. The rotary shaft of the steering motor 400 may be elongated in the upward/downward direction, and the hollow portion of the rotary shaft of the steering motor 400 may be elongated in the upward/downward direction.

The input shaft 420 may penetrate the hollow portion of the rotary shaft of the steering motor 400. The input shaft 420 may be elongated in the upward/downward direction. The upper end of the input shaft 420 may be disposed to protrude from the upper end of the steering motor 400.

The upper and lower ends of the input shaft 420 may be rotatably coupled in the housing of the steering motor 400 by means of bearings.

In the state in which the input shaft 420 is installed to penetrate the rotary shaft of the steering motor 400, the rotary shaft and the input shaft 420 of the steering motor 400 may rotate That is, the input shaft 420 may independently of each other. penetrate the hollow portion of the rotary shaft of the steering motor 400 in the axial direction and rotate in a circumferential direction relative to the rotary shaft of the steering motor 400.

The steering motor 400 may include a motor housing opened at upper and lower ends thereof, and a motor cover configured to cover the opened upper end of the motor housing. The motor housing and the motor cover may define an external appearance of the steering motor 400. The motor housing may be formed in a cylindrical shape opened at upper and lower ends thereof. The motor cover may be formed in a cylindrical shape opened at a lower end thereof and cover the opened upper end of the motor housing. The upper end of the motor housing and the lower end of the motor cover may be fastened by means of a plurality of bolts.

The upper end of the input shaft 420 may penetrate a center of the motor cover of the steering motor 400 and be disposed to protrude upward from the steering motor 400.

The speed reducer 430 may be coupled to the lower end of the housing of the steering motor 400. A lower end of the input shaft 420 may be disposed to protrude from a lower end of the speed reducer 430.

The speed reducer 430 may include a speed reducer housing opened at upper and lower ends thereof, and a speed reducer cover configured to cover the opened lower end of the speed reducer housing. The speed reducer housing and the speed reducer cover may define an external appearance of the speed reducer 430. The speed reducer housing may be formed in a cylindrical shape opened at upper and lower ends thereof. The speed reducer cover may be formed in a cylindrical shape opened at an upper end thereof and cover the opened lower end of the speed reducer housing. The speed reducer housing and the speed reducer cover may be fastened by means of a plurality of bolts.

In addition, the opened lower end of the motor housing and the opened upper end of the speed reducer housing may be disposed to be in contact with each other. The lower end of the motor housing and the speed reducer housing may be fastened by means of the plurality of bolts.

The lower end of the input shaft 420 may penetrate a center of the speed reducer cover of the speed reducer 430 and be disposed to protrude downward from the speed reducer 430.

The speed reducer 430 may reduce a rotational speed of the rotary shaft of the steering motor 400 and transmit the rotational speed to the input shaft 420. The speed reducer 430 may reduce a rotational speed of the rotary shaft of the steering motor 400 by means of a plurality of gears therein and transmit the rotational speed to the input shaft 420. In this case, the plurality of gears may be planet gears or harmonic gears.

The plurality of gears may include a sun gear (not illustrated) coupled to an outer periphery of the rotary shaft of the steering motor 400 and having gear teeth formed on an outer periphery of the sun gear, a ring gear (not illustrated) coupled to an inner side of the speed reducer housing and having gear teeth formed on an inner periphery of the ring gear, a plurality of planetary gears (not illustrated) disposed between the sun gear and the ring gear, and a carrier (not illustrated) configured to connect the plurality of planetary gears.

The plurality of planetary gears may be disposed to be spaced apart from one another along the outer periphery of the sun gear. The ring gear may be fixed to the inner side of the speed reducer housing so as not to rotate in the circumferential direction. The plurality of planetary gears may each have gear teeth formed on an outer periphery thereof. The gear teeth, which are formed on the outer periphery of each of the plurality of planetary gears, may engage with the gear teeth of the sun gear and the gear teeth of the ring gear. The carrier may be coupled to the plurality of planetary gears and coupled to the outer periphery of the input shaft 420.

Therefore, when the rotary shaft of the steering motor 400 rotates, the sun gear may rotate in the same direction as the rotary shaft, and thus the plurality of planetary gears may rotate in the opposite direction to the sun gear. Because the carrier is coupled to the plurality of planetary gears, the carrier may rotate in the same direction as the plurality of planetary gears when the plurality of planetary gears rotates, such that the carrier may rotate the input shaft 420.

The pinion gear 441 may be formed on the outer periphery of the pinion shaft 440. The pinion gear 441 may engage with the rack of the rack bar 520 provided in the housing 510 of the steering gear 500 and configured to be rectilinearly movable in a leftward/rightward direction.

The lower end of the input shaft 420 and an upper end of the pinion shaft 440 may be coupled by a coupling pin. That is, the coupling pin may couple the upper end to the pinion shaft 440 to the lower end of the input shaft 420 that is a portion disposed to protrude from the lower end of the speed reducer 430. Therefore, the pinion shaft 440 may be easily coupled to the input shaft 420 from outside the steering motor 400 and the speed reducer 430.

A groove may be formed in the axial direction at the upper end of the pinion shaft 440, and the lower end of the input shaft 420 has a smaller diameter than the other portions of the input shaft 420, such that the lower end of the input shaft 420 may be inserted into the groove formed at the upper end of the pinion shaft 440. On the contrary, a groove may be formed in the axial direction at the lower end of the input shaft 420. In this case, the upper end of the pinion shaft 440 may have a smaller diameter than the other portions, such that the upper end of the pinion shaft 440 may be inserted into the groove formed at the lower end of the input shaft 420.

Coupling pin coupling holes may be respectively formed at the lower end of the input shaft 420 and the upper end of the pinion shaft 440, and the coupling pin may be inserted and coupled into the coupling pin coupling holes. The coupling pin coupling holes may be respectively formed in an outer periphery of the lower end of the input shaft 420 and an outer periphery of the upper end of the pinion shaft 440 and communicate with each other in a radial direction.

That is, an operator may couple the upper end of the pinion shaft 440 to the lower end of the input shaft 420 by fitting the lower end of the input shaft 420 into the groove formed at the upper end of the pinion shaft 440 and inserting the coupling pin into the coupling pin coupling holes.

A speed reducer mounting portion 511 may be formed in the housing 510 of the steering gear 500, and a screw thread may be formed on an inner peripheral surface of the speed reducer mounting portion 511. In addition, a screw thread, which is screw-coupled to the screw thread formed on the inner peripheral surface of the speed reducer mounting portion 511, may be formed on an outer peripheral surface of a portion of the housing of the speed reducer 430 that is inserted into the speed reducer mounting portion 511, such that the speed reducer 430 may be installed in the speed reducer mounting portion 511 of the steering gear 500 without a separate bracket.

Hereinafter, the intermediate shaft 300 of the steering apparatus for a vehicle according to the embodiment of the present invention will be described specifically.

The intermediate shaft 300 may include a yoke tube 310 and a cable 320. The yoke tube 310 may define an upper portion of the intermediate shaft 300, and the cable 320 may define a lower portion of the intermediate shaft 300. However, the positions of the yoke tube 310 and the cable 320 may be changed. That is, the yoke tube 310 may define the lower portion of the intermediate shaft 300, and the cable 320 may define the upper portion of the intermediate shaft 300.

In case that the yoke tube 310 defines the upper portion of the intermediate shaft 300 and the cable 320 defines the lower portion of the intermediate shaft 300, a first U-shaped member 331 may be disposed at an upper end of the yoke tube 310, a hollow portion 315 may be formed at a lower end of the yoke tube 310, a second U-shaped member 341 may be disposed at a lower end of the cable 320, and a first coupler 360 may be provided at an upper end of the cable 320.

In case that the yoke tube 310 defines the lower portion of the intermediate shaft 300 and the cable 320 defines the upper portion of the intermediate shaft 300, the first U-shaped member 331 may be disposed at the lower end of the yoke tube 310, the hollow portion 315 may be formed at the upper end of the yoke tube 310, the second U-shaped member 341 may be disposed at the upper end of the cable 320, and the first coupler 360 may be provided at the lower end of the cable 320.

Hereinafter, the description will be limited to the configuration in which the yoke tube 310 defines the upper portion of the intermediate shaft 300 and the cable 320 defines the lower portion of the intermediate shaft 300. Further, the upper end of the yoke tube 310 may refer to one end of the yoke tube 310, and the lower end of the yoke tube 310 may refer to the other end of the yoke tube 310. In addition, the lower end of the cable 320 may refer to one end of the cable 320, and the upper end of the cable 320 may refer to the other end of the cable 320. In addition, an upper surface of a second coupler 370 may refer to one surface of the second coupler 370, and a lower end of the second coupler 370 may refer to the other end of the second coupler 370. In addition, an upper surface of a neck portion 348 of the second U-shaped member 341 may refer to one surface of the neck portion 348 of the second U-shaped member 341.

The upper end of the yoke tube 310 may be connected to the steering shaft 200 by means of the first universal joint 330.

The first universal joint 330 may include the first U-shaped member 331, a third U-shaped member 332, and a first cross-shaped connection member 333.

The first U-shaped member 331 may be disposed at the upper end of the yoke tube 310. A neck portion of the first U-shaped member 331 may be coupled to the upper end of the yoke tube 310. For example, the upper end of the yoke tube 310 may be inserted and coupled into a groove formed at a lower end of the neck portion of the first U-shaped member 331.

The third U-shaped member 332 may be disposed at the lower end of the steering shaft 200. A neck portion of the third U-shaped member 332 may be coupled to the lower end of the steering shaft 200. For example, the lower end of the steering shaft 200 may be inserted and coupled into a groove formed at an upper end of the neck portion of the third U-shaped member 332.

The first cross-shaped connection member 333 may be formed in a shape in which two first straight lines are disposed to intersect each other. Bearings, which are provided at two opposite ends of any one of the two first straight lines, are inserted into holes formed in two opposite side portions of the first U-shaped member 331 that are spaced apart from each other, such that the first U-shaped member 331 may be rotatably coupled to the first cross-shaped connection member 333. Bearings, which are provided at two opposite ends of the other of the two first straight lines, are inserted into holes formed in two opposite side portions of the third U-shaped member 332 that are spaced apart from each other, such that the third U-shaped member 332 may be rotatably coupled to the first cross-shaped connection member 333.

The hollow portion 315 (see FIGS. 3 and 4) may be formed in the axial direction at the lower end of the yoke tube 310. The upper end of the cable 320 may be disposed and inserted into the hollow portion 315 of the yoke tube 310 by means of the lower end of the yoke tube 310.

The lower end of the cable 320 may be coupled to the steering motor 400 by means of the second universal joint 340. The cable 320 may be a control cable for controlling the steering motor 400. However, the cable 320 does not necessarily control the steering motor 400. For example, the cable 320 may be a simple cable capable of packaging the intermediate shaft 300.

The second universal joint 340 may include the second U-shaped member 341, a fourth U-shaped member 342, and a second cross-shaped connection member 343.

The second U-shaped member 341 may be disposed at the lower end of the cable 320. The neck portion 348 (see FIGS. 6 to 8) of the second U-shaped member 341 may be coupled to the lower end of the cable 320. For example, the lower end of the cable 320 may be inserted and coupled into a groove formed at an upper end of the neck portion 348 of the second U-shaped member 341.

The fourth U-shaped member 342 may be disposed at the upper end of the steering motor 400. A neck portion of the fourth U-shaped member 342 may be coupled to the upper end of the steering motor 400. For example, the input shaft 420 protruding from the upper end of the steering motor 400 may be inserted and coupled into a groove formed at a lower end of the neck portion of the fourth U-shaped member 342.

The second cross-shaped connection member 343 may be formed in a shape in which two second straight lines are disposed to intersect each other. Bearings, which are provided at two opposite ends of any one of the two second straight lines, are inserted into holes formed in two opposite side portions of the second U-shaped member 341 that are spaced apart from each other, such that the second U-shaped member 341 may be rotatably coupled to the second cross-shaped connection member 343. Bearings, which are provided at two opposite ends of the other of the two second straight lines, are inserted into holes formed in two opposite side portions of the fourth U-shaped member 342 that are spaced apart from each other, such that the fourth U-shaped member 342 may be rotatably coupled to the second cross-shaped connection member 343.

Figure 3:
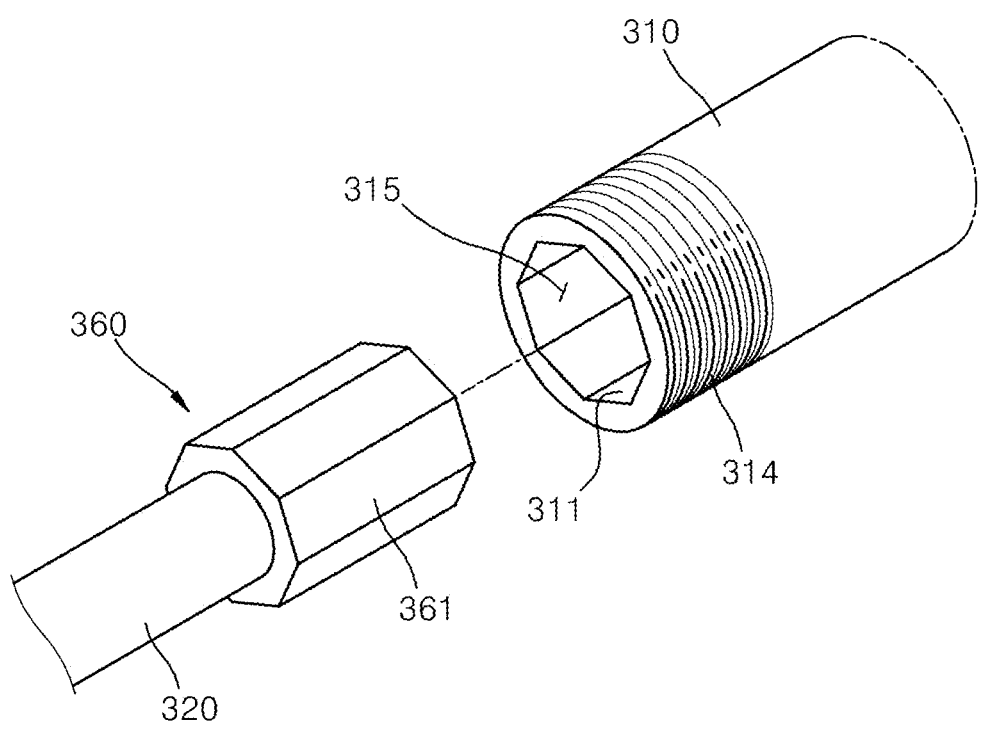
FIG. 3 is an exploded perspective view illustrating an embodiment of a structure in which an upper end of a cable illustrated in FIG. 1 is coupled to a yoke tube.

FIG. 3 is an exploded perspective view illustrating an embodiment of a structure in which the upper end of the cable illustrated in FIG. 1 is coupled to the yoke tube.

With reference to FIGS. 1 and 3, the first coupler 360 may be provided at the upper end of the cable 320. The first coupler 360 may be formed in a short rod shape. After the upper end of the cable 320 is inserted into a groove formed at a center of a lower end of the first coupler 360, an outer side of the first coupler 360 is pressed, such that the upper end of the cable 320 and the first coupler 360 may be coupled by caulking.

The first coupler 360 may be disposed and inserted into the hollow portion 315 formed at the lower end of the yoke tube 310. The first coupler 360 may be installed in the hollow portion 315 of the yoke tube 310 and configured to be movable in the axial direction. However, the first coupler 360 may be installed so as not to move in the axial direction in the hollow portion 315 of the yoke tube 310.

At least one first planar portion 311 may be formed on an inner peripheral surface of the yoke tube 310. Further, at least one second planar portion 361 may be formed on an outer peripheral surface of the first coupler 360 and configured to come into contact with at least one first planar portion 311.

The inner periphery surface shape of the hollow portion 315 of the yoke tube 310 may be identical to the outer periphery surface shape of the first coupler 360. The first planar portion 311 and the second planar portion 361 may be equal in number to each other. However, the inner periphery surface shape of the hollow portion 315 of the yoke tube 310 does not necessarily need to be identical to the outer periphery surface shape of the first coupler 360. The inner periphery surface shape of the hollow portion 315 of the yoke tube 310 and the outer periphery surface shape of the first coupler 360 may be variously modified as long as the first coupler 360 may not rotate in the circumferential direction relative to the yoke tube 310 in the state in which the first coupler 360 is inserted into the hollow portion 315. In the present embodiment, the first coupler 360 may be formed in an octagonal shape having six second planar portions 361 formed on the outer peripheral surface thereof. However, at least one second planar portion 361 may only need to be formed on the outer peripheral surface of the first coupler 360.

Figure 4:
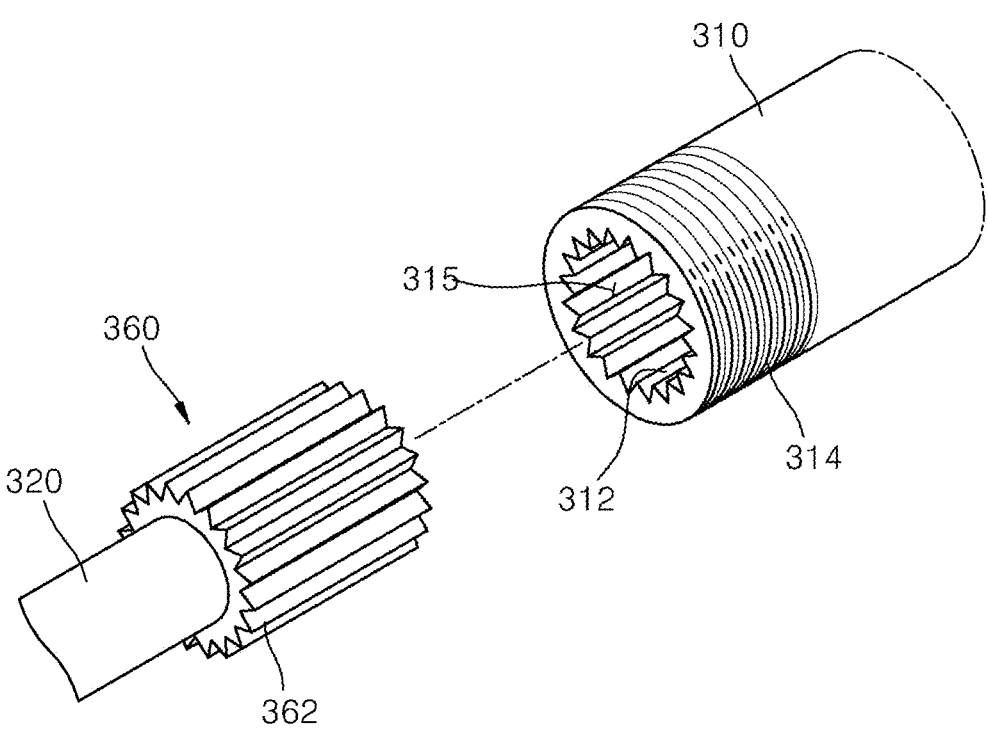
FIG. 4 is an exploded perspective view illustrating another embodiment of the structure in which the upper end of the cable illustrated in FIG. 1 is coupled to the yoke tube.

FIG. 4 is an exploded perspective view illustrating another embodiment of the structure in which the upper end of the cable illustrated in FIG. 1 is coupled to the yoke tube.

With reference to FIGS. 1 and 4, a plurality of serration grooves 312 may be formed on the inner peripheral surface of the yoke tube 310. Further, a plurality of serration protrusions 362 may be formed on the outer peripheral surface of the first coupler 360 and be respectively inserted into the plurality of serration grooves 312.

The plurality of serration grooves 312 may be elongated in the axial direction of the yoke tube 310 and disposed to be spaced apart from one another in the circumferential direction of the yoke tube 310. Further, the plurality of serration protrusions 362 may be elongated in the axial direction of the first coupler 360 and disposed to be spaced apart from one another in the circumferential direction of the first coupler 360.

Figure 5:
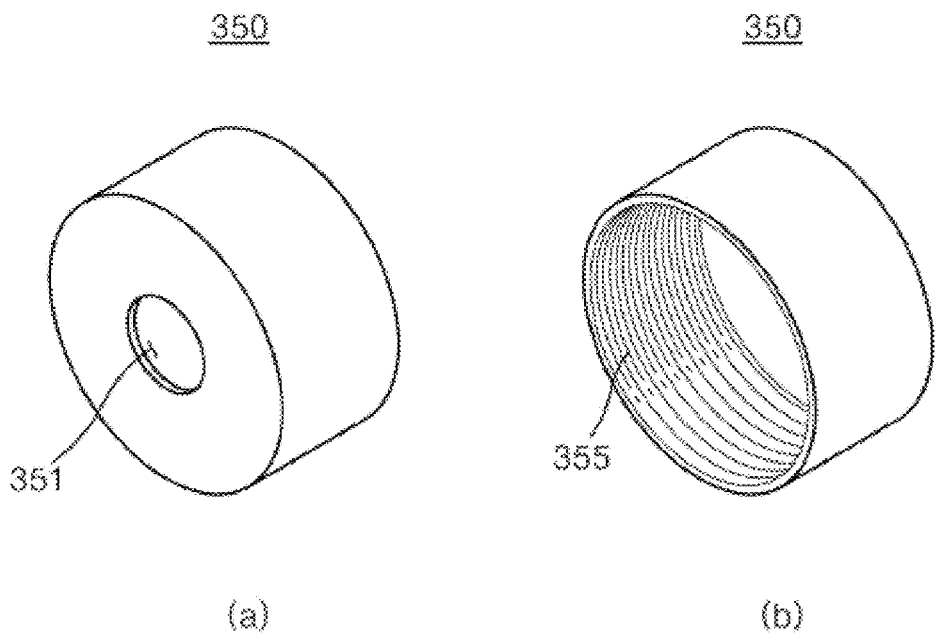
FIG. 5 is a view illustrating a cover illustrated in FIG. 1, in which (a) is a bottom perspective view, and (b) is a top perspective view.

FIG. 5 is a view illustrating a cover illustrated in FIG. 1, in which (a) is a bottom perspective view, and (b) is a top perspective view.

With reference to FIGS. 1 and 5, a cover 350 having a column shape may be coupled to the lower end of the yoke tube 310. The cover 350 may be coupled to the lower end of the yoke tube 310 after the first coupler 360 provided at the upper end of the cable 320 is disposed and inserted into the hollow portion 315 of the yoke tube 310, such that it is possible to prevent the first coupler 360, which is disposed and inserted into the hollow portion 315 of the yoke tube 310, from being withdrawn from the hollow portion 315.

A screw thread 355, which is coupled to the screw thread (314) formed on the outer peripheral surface of the lower end of the yoke tube 310, is formed on the inner peripheral surface of the cover 350, such that the operator may couple the cover 350 to the lower end of the yoke tube 310 by rotating the cover 350 while covering the outer peripheral surface of the lower end of the yoke tube 310 at the lower end of the yoke tube 310.

The cover 350 may be opened at an upper side thereof, and a through-hole 351 may be formed in a lower surface of the cover 350 so that the cable 320 penetrates the through-hole 351. A diameter of the through-hole 351 may be equal to or larger than a diameter of the cable 320 and smaller than a largest outer diameter of the first coupler 360 to prevent the first coupler 360 from being withdrawn from the hollow portion 315 of the yoke tube 310. Of course, a diameter of the through-hole 351 may be smaller than a largest outer diameter of the second coupler 370 (see FIGS. 6 to 8) to be described below. That is, the first coupler 360 and the second coupler 370 may not pass through the through-hole 351 of the cover 350.

The operator may allow the cable 320 to penetrate the through-hole 351 of the cover 350, and then the operator may couple the first coupler 360 to the upper end of the cable 320 and couple the second coupler 370 to the lower end of the cable 320.

Figure 6:
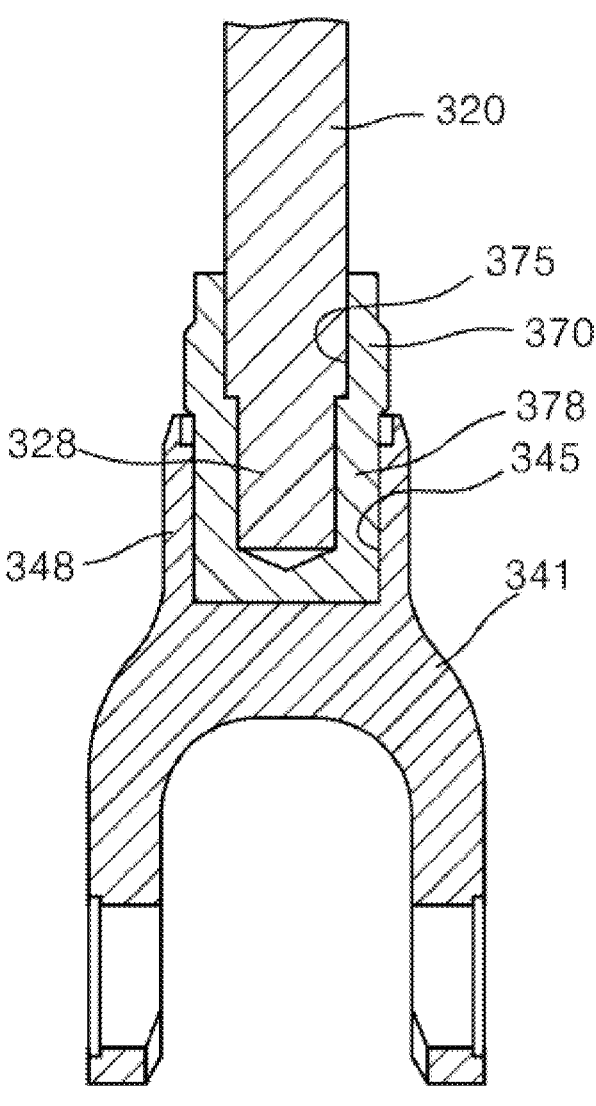
FIG. 6 is a longitudinal sectional view illustrating an embodiment of a structure in which a lower end of the cable illustrated in FIG. 1 is coupled to a neck portion of a second U-shaped member.

FIG. 6 is a longitudinal sectional view illustrating an embodiment of a structure in which the lower end of the cable illustrated in FIG. 1 is coupled to the neck portion of the second U-shaped member.

With reference to FIGS. 1 and 6, the second coupler 370 may be provided at the lower end of the cable 320. The second coupler 370 may be coupled to the neck portion 348 of the second U-shaped member 341 of the second universal joint 340.

A first inner groove 375 may be formed in the upper surface of the second coupler 370, and a second inner groove 345 may be formed in the upper surface of the neck portion 348 of the second U-shaped member 341. In the state in which the lower end of the cable 320 is inserted into the first inner groove 375 formed in the upper surface of the second coupler 370 and the lower end of the second coupler 370 is inserted into the second inner groove 345 formed in the upper surface of the neck portion 348 of the second U-shaped member 341, an outer side of the neck portion 348 of the second U-shaped member 341 is pressed inward by a caulking tool, such that the lower end of the cable 320, the lower end of the second coupler 370, and the neck portion 348 of the second U-shaped member 341 may be coupled by caulking.

Figure 7:
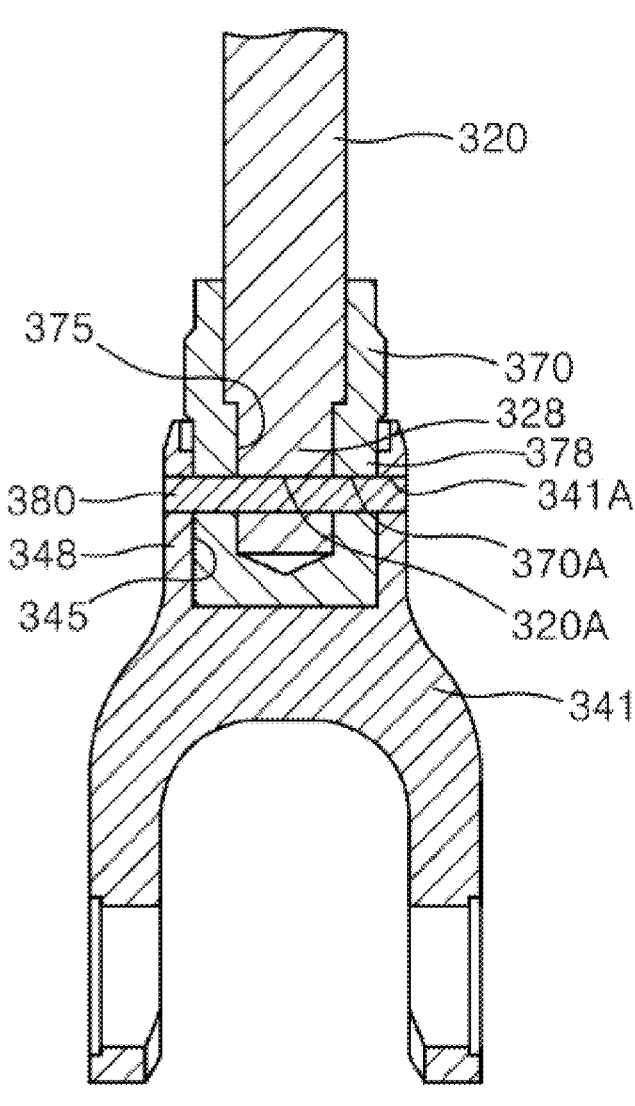
FIG. 7 is a longitudinal sectional view illustrating another embodiment of the structure in which the lower end of the cable illustrated in FIG. 1 is coupled to the neck portion of the second U-shaped member.

FIG. 7 is a longitudinal sectional view illustrating another embodiment of the structure in which the lower end of the cable illustrated in FIG. 1 is coupled to the neck portion of the second U-shaped member.

With reference to FIGS. 1 and 7, first pin coupling holes 341A may be formed at two opposite sides of the neck portion 348 of the second U-shaped member 341 and communicate with the second inner groove 345, second pin coupling holes 370A may be formed at two opposite sides of the lower end of the second coupler 370 and communicate with the first inner groove 375, and a third pin coupling hole 320A may be formed at the lower end of the cable 320. The first pin coupling holes 341A, the second pin coupling holes 370A, and the third pin coupling hole 320A may be coupled by a straight pin 380.

Specifically, in the state in which the lower end of the cable 320 is inserted into the first inner groove 375 formed in the upper surface of the second coupler 370 and the lower end of the second coupler 370 is inserted into the second inner groove 345 formed in the upper surface of the neck portion 348 of the second U-shaped member 341, the pin 380 penetrates the first pin coupling holes 341A, which are formed at the two opposite sides of the neck portion 348 of the second U-shaped member 341 and communicate with the second inner groove 345, the second pin coupling holes 370A, which are formed at the two opposite sides of the lower end of the second coupler 370 and communicate with the first inner groove 375, and the third pin coupling hole 320A formed at the lower end of the cable 320, such that the lower end of the cable 320, the lower end of the second coupler 370, and the neck portion 348 of the second U-shaped member 341 may be coupled by the pin.

Figure 8:
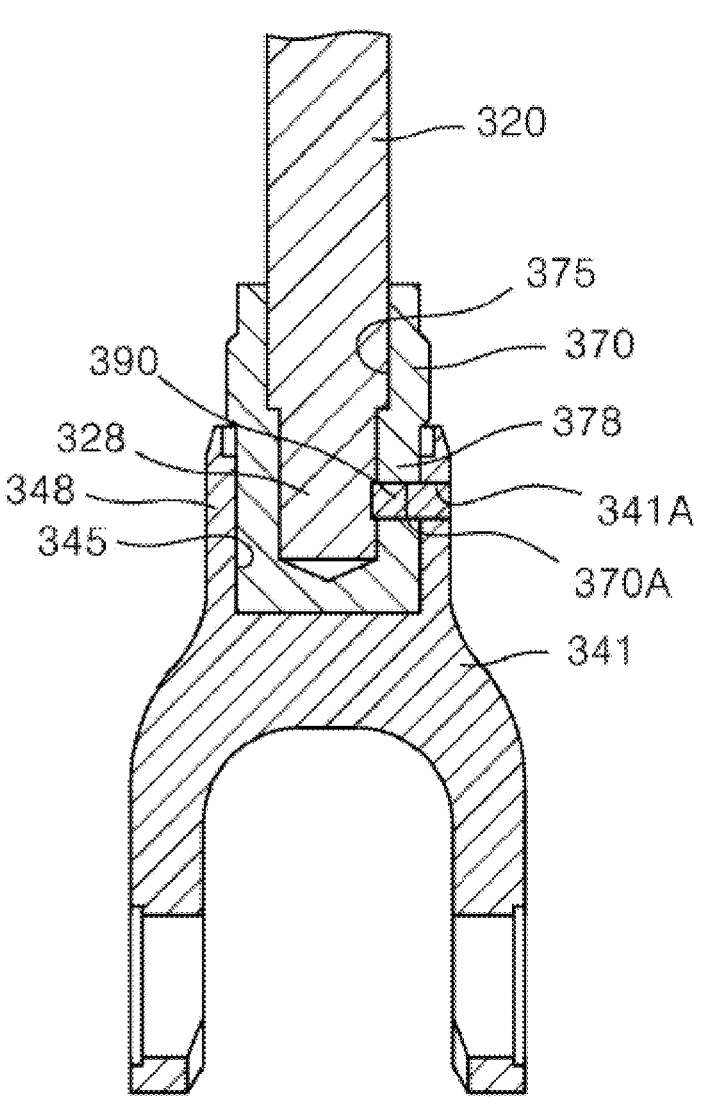
FIG. 8 is a longitudinal sectional view illustrating still another embodiment of the structure in which the lower end of the cable illustrated in FIG. 1 is coupled to the neck portion of the second U-shaped member.

FIG. 8 is a longitudinal sectional view illustrating still another embodiment of the structure in which the lower end of the cable illustrated in FIG. 1 is coupled to the neck portion of the second U-shaped member.

With reference to FIGS. 1 and 8, the first pin coupling hole 341A may be formed at one side of the neck portion 348 of the second U-shaped member 341 and communicate with the second inner groove 345, and the second pin coupling hole 370A may be formed at one side of the lower end of the second coupler 370 and communicate with the first inner groove 375. The first pin coupling hole 341A and the second pin coupling hole 370A may be coupled by a straight pin 390. In this case, the pin 390 may be shorter than the pin 380 illustrated in FIG. 7.

In the state in which the lower end of the cable 320 is inserted into the first inner groove 375 formed in the upper surface of the second coupler 370 and the lower end of the second coupler 370 is inserted into the second inner groove 345 formed in the upper surface of the neck portion 348 of the second U-shaped member 341, the pin 390 penetrates the first pin coupling hole 341A, which is formed at one side of the neck portion 348 of the second U-shaped member 341 and communicates with the second inner groove 345, and the second pin coupling hole 370A, which is formed at one side of the lower end of the second coupler 370 and communicates with the first inner groove 375, and an end of the pin 390 presses the outer peripheral surface of the lower end of the cable 320, such that the lower end of the cable 320, the lower end of the second coupler 370, and the neck portion 348 of the second U-shaped member 341 may be coupled by the pin.

Meanwhile, with reference to FIGS. 6 to 8, a first press-fitting portion 328 may be formed at the lower end of the cable 320, and a second press-fitting portion 378 may be formed on the second coupler 370. Like the shape of the outer periphery surface of the first coupler 360 illustrated in FIG. 3, the first press-fitting portion 328 may be formed in an angular shape (e.g., an octagonal shape). An outer peripheral surface of the first press-fitting portion 328 may be press-fitted into an inner peripheral surface of the second press-fitting portion 378. The inner periphery surface shape of the second press-fitting portion 378, into which the outer peripheral surface of the first press-fitting portion 328 is fitted, may be formed in an angular shape corresponding to the shape of the outer periphery surface of the first press-fitting portion 328.

In addition, like the shape of the hollow portion 315 of the yoke tube 310 illustrated in FIG. 3, the inner periphery surface of the neck portion 348 of the second U-shaped member 341 may be formed in an angular shape (e.g., an octagonal shape). An outer peripheral surface of the second press-fitting portion 378 may be press-fitted into an inner peripheral surface of the neck portion 348, and the outer periphery surface shape of the second press-fitting portion 378, which is press-fitted into the inner peripheral surface of the neck portion 348, may be formed in an angular shape corresponding to the shape of the inner periphery surface of the neck portion 348.

In addition, the upper end of the cable 320, which is a portion inserted and coupled into the first coupler 360, and the lower end of the cable 320, which is a portion inserted and coupled into the second coupler 370, may be hot-compressed into a compressed quadrangular cross-sectional shape and may be configured by steel wires twisted and braided to have torsional rigidity of a predetermined value or more.

As described above, the intermediate shaft 300 of the steering apparatus for a vehicle according to the embodiment of the present invention includes the yoke tube 310, and the cable 320 connected to the first coupler 360 disposed and inserted into the hollow portion 315 of the yoke tube 310, such that it is possible to electrically and electronically control the steering motor 400 by using some components of the steering apparatus having the physical connection structure in the related art.

In addition, the intermediate shaft 300 of the steering apparatus for a vehicle according to the embodiment of the present invention may be adjusted in overall axial length by moving the first coupler 360 in the axial direction in the yoke tube 310, such that the length of the intermediate shaft 300 may be adjusted to suit the specifications of the types of vehicles, and then the intermediate shaft 300 may be installed in various types of vehicles.

A person skilled in the art may understand that the present invention may be carried out in other specific forms without changing the technical spirit or the essential characteristics of the present invention. Therefore, it should be understood that the above-described embodiments are illustrative in all aspects and do not limit the present invention. The scope of the present invention is represented by the claims to be described below rather than the detailed description, and it should be interpreted that the meaning and scope of the claims and all the changes or modified forms derived from the equivalent concepts thereto fall within the scope of the present invention.

The present invention provides the intermediate shaft of the steering apparatus for a vehicle, the steering apparatus being capable of electrically and electronically controlling the steering motor by using some components of the steering apparatus having the physical connection structure in the related art.

The invention claimed is:

1. An intermediate shaft of a steering apparatus for a vehicle, the intermediate shaft comprising:

a yoke tube having a first end at which a first U-shaped member is disposed, and a second end at which a hollow portion is formed in an axial direction;

a cable having a first end at which a second U-shaped member is disposed;

a first coupler provided at a second end of the cable and disposed and inserted into the hollow portion; and a second coupler provided at the first end of the cable and coupled to a neck portion of the second U-shaped member, wherein in a state in which the first end of the cable is inserted into a first inner groove formed in one surface of the second coupler and an end of the second coupler is inserted into a second inner groove formed in one surface of the neck portion of the second U-shaped member, an outer side of the neck portion of the second U-shaped member is pressed inwardly by a caulking tool, such that the first end of the cable, the end of the second coupler, and the neck portion of the second U-shaped member are coupled by caulking.

2. The intermediate shaft of claim 1, wherein the first coupler is disposed in the hollow portion and configured to be movable in the axial direction.

3. The intermediate shaft of claim 1, wherein at least one first planar portion is formed on an outer peripheral surface of the first coupler and configured to come into contact with at least one second planar portion formed on an inner peripheral surface of the yoke tube.

4. The intermediate shaft of claim 1, wherein a plurality of serration protrusions is formed on an outer peripheral surface of the first coupler and respectively inserted into a plurality of serration grooves formed in an inner peripheral surface of the yoke tube.

5. The intermediate shaft of claim 1, further comprising:

a cover having a column shape, coupled to the second end of the yoke tube, and configured to prevent the first coupler from being withdrawn from the hollow portion.

6. The intermediate shaft of claim 5, wherein a screw thread is formed on an inner peripheral surface of the cover and coupled to a screw thread formed on an outer peripheral surface of the second end of the yoke tube.

\* \* \* \* \*